United States Patent [19]

Tarum et al.

[11] Patent Number: 4,746,240

[45] Date of Patent: May 24, 1988

[54] SELF CRIMPING CONNECTION FOR INNER AND OUTER MEMBERS AND METHOD OF ASSEMBLING THE SAME

[75] Inventors: Carl D. Tarum, Saginaw; D. Craig Cook, Frankenmuth, both of Mich.

[73] Assignee: General Motors Corporation, Detroit, Mich.

[21] Appl. No.: 32,640

[22] Filed: Apr. 1, 1987

[51] Int. Cl.[4] .................. B25G 3/28; F16G 11/00; B21D 39/00; B23P 11/00

[52] U.S. Cl. ........................ 403/282; 29/520; 29/523; 285/382.2; 403/285; 403/355; 411/24; 411/448

[58] Field of Search .............. 29/520, 522 R, 523; 403/282, 285, 355; 411/24, 447, 448, 517, 519; 285/382.1, 382.2

[56] References Cited

U.S. PATENT DOCUMENTS

| | | | |
|---|---|---|---|
| 2,415,422 | 2/1947 | Fogg | 403/282 |
| 3,234,727 | 2/1966 | Filer | 29/520 UX |
| 3,318,413 | 5/1967 | Werner et al. | 403/282 X |
| 3,458,920 | 8/1969 | Crump | 29/523 X |
| 3,521,912 | 7/1970 | Maurer | 29/522 R X |
| 3,668,966 | 6/1972 | Kincaid | 411/24 |
| 4,099,323 | 7/1978 | Bouvier | 29/520 X |
| 4,389,134 | 6/1983 | Colas | 403/282 X |
| 4,485,847 | 12/1984 | Wentzell | 411/24 X |
| 4,597,687 | 7/1986 | Colas | 403/282 X |
| 4,682,832 | 7/1987 | Punako | 29/520 X |

Primary Examiner—Charlie T. Moon
Attorney, Agent, or Firm—Arthur N. Krein

[57] ABSTRACT

A self crimping connection for inner and outer members and the method of making the same includes providing the inner member with stepped cylindrical exterior walls defining an outboard wall of reduced diameter relative to an inboard wall with an annular groove in the outboard wall; providing the outer member with a stepped bore defining an internal outboard wall and an inboard wall to slidably receive the outboard and inboard walls, respectively, of the inner member, with an annular groove in the outboard wall of the outer member; a first bushing encircling the outboard wall of the inner member and a second bushing encircling the outboard wall of the outer member, with each of the first and second bushings having a body portion and a crimp collar portion, the arrangement being such that as the inner member and first bushing are axially pressed into the outer member and its associate second bushing, the crimp collar portion of the first bushing is crimped into locking engagement into the annular groove in the outboard wall of the outer member and the crimp collar portion of the second bushing is crimped into locking engagement into the annular groove in the inner member. Preferably, one of the walls is also knurled so as to also prevent rotation of these members as well as axial movement relative to each other.

4 Claims, 3 Drawing Sheets

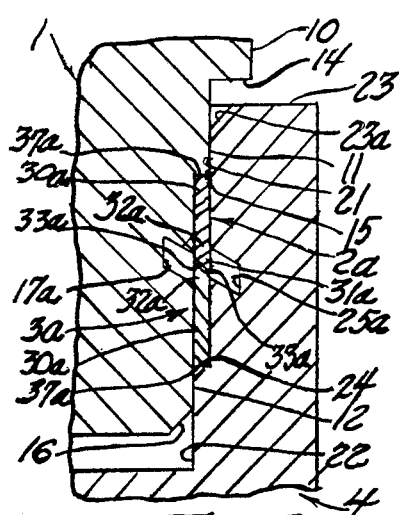
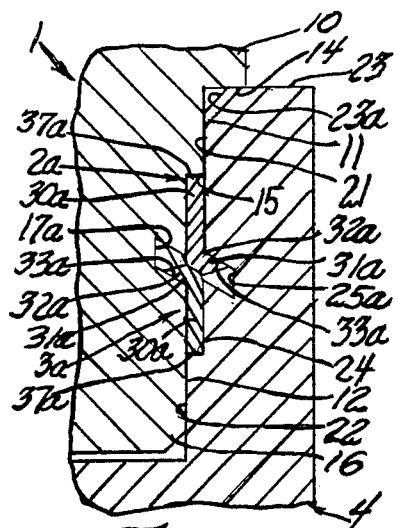
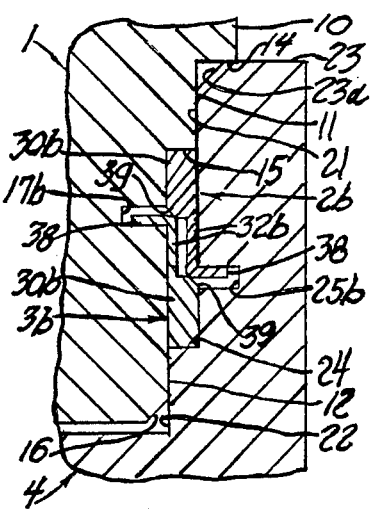
Fig. 5  Fig. 6  Fig. 7
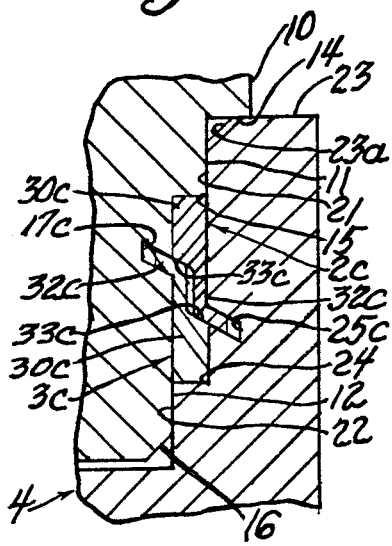
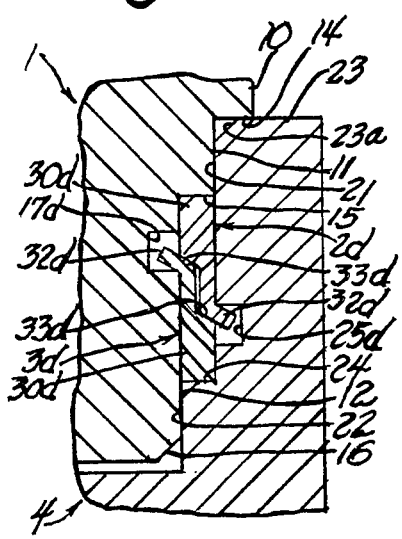
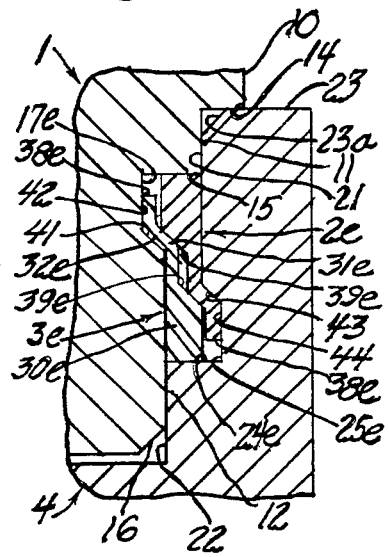
Fig. 8  Fig. 9  Fig. 10
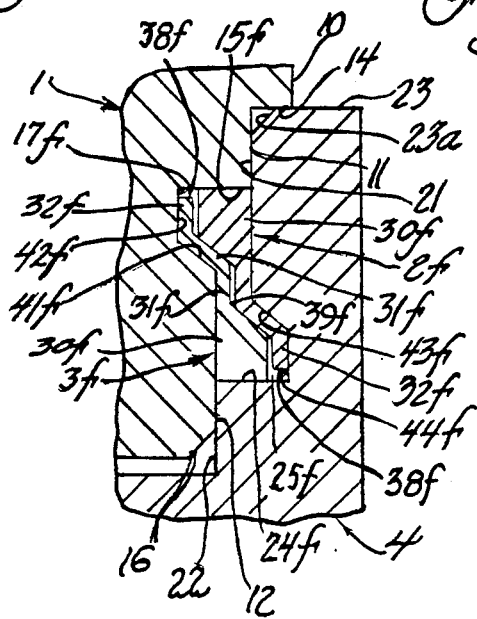
Fig. 11

SELF CRIMPING CONNECTION FOR INNER AND OUTER MEMBERS AND METHOD OF ASSEMBLING THE SAME

FIELD OF THE INVENTION

This invention relates to apparatus for connecting together two members and, in particular, to a self crimping connection for inner and outer members which may be in the form of tubular members or parts of various machine elements and the like and to the method of assembling the same.

DESCRIPTION OF THE PRIOR ART

Various arrangements have been used in the prior art to secure, for example, cylindrical inner and outer members together. By way of examples, such cylindrical inner and outer members have been axially secured together as by retaining rings, both external and internal; by injecting a plastic material into radially aligned grooves in these members; and, by the use of screw-type fasteners extending through the outer member so as to engage the inner member.

SUMMARY OF THE INVENTION

The present invention relates to a self crimping connection for inner and outer members and the method of assembling the same wherein the inner member at one end thereof is provided with stepped reduced external diameter end portions, the outward end portion having a radially inward extending groove therein, and wherein the outer member is provided with a stepped bore, the outboard end internal wall of which has stepped internal diameters to slidably receive the stepped reduced diameter end portions of the inner member, with the outboard wall thereof being provided with a radially outward extending groove, a circular first bushing encircling the outboard end portion of the inner member and a circular second bushing encircling the outboard inner wall of the outer member, the first bushing and second bushing each having opposed end cam like portions that are arranged so that as the inner and outer members are axially forced together, the cam like portions of the first bushing are crimped into locking engagement with the groove in the outer member and the cam like portions of the second bushing are crimped into locking engagement with the groove in the inner member to thus lock the inner and outer members axially together. In addition, at least one of these members can be provided with a knurled surface to prevent rotation of the inner member relative to the outer member.

It is therefore a primary object of this invention to provide a self crimping connection for inner and outer members and the method of assembling the same that uses first and second bushings associated with the inner and outer members, respectively, such that when these members are pressed together axially, a portion of the first bushing is crimped into a groove in the outer member and a portion of the second bushing is crimped into a groove in the inner member.

Another object of this invention is to provide an improved connection between inner and outer members each of which is provided with an annular groove so that a pair of opposed bushings are arranged so as to have portions thereof crimped into the respective grooves to prevent axial movement of the inner member relative to the outer member, with at least one of these members having a knurled surface to engage a mating surface of the other member to prevent relative rotation of these members relative to each other.

For a better understanding of the invention as well as other objects and further features thereof, reference is made to the following detailed description of the invention to be read in connection with the accompanying drawings.

BRIEF DESCRIPTION OF THE DRAWINGS

FIGS. 5 and 6 are views similar to FIGS. 2 and 3, respectively, but showing a second embodiment of the subject self crimping connection for cylindrical inner and outer members;

FIGS. 7 to 11 are views similar to FIGS. 3 and 6, but showing still further alternate embodiments of self crimping connections of inner and outer members;

DESCRIPTION OF THE VARIOUS EMBODIMENTS

Figure 1:
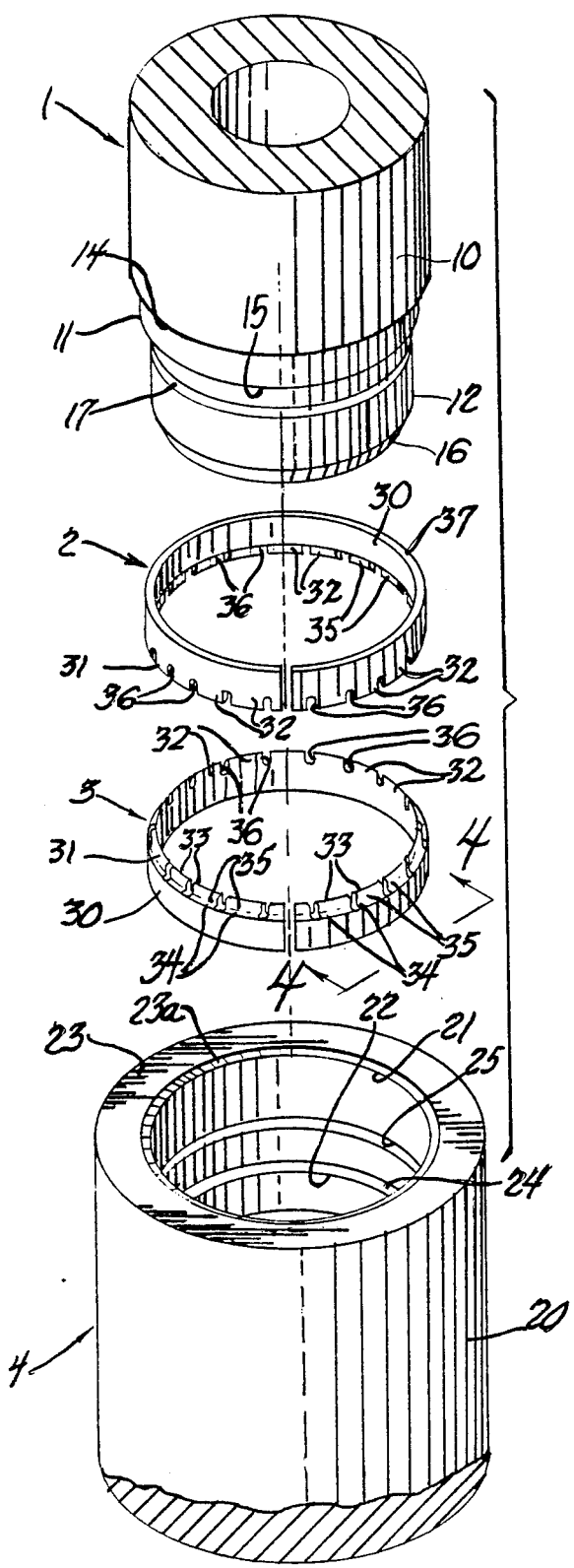
FIG. 1 is an exploded view of the elements to effect the self crimping connection of an inner member to an outer member by two bushing members in accordance with a first embodiment of the invention.

Referring first to FIGS. 1–4 there is shown the elements for a self crimping connection of cylindrical inner and outer members which, as best seen in FIG. 1, basically includes four parts comprising of an inner member, generally designated 1, a first bushing 2, a second bushing 3 and, an outer member, generally designated 4.

Figure 2:
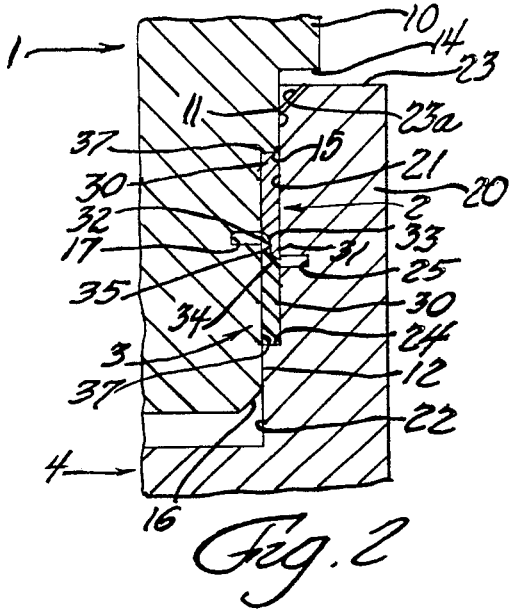
FIG. 2 is an axial cross-sectional view of the assembly of the elements of FIG. 1 prior to the self-crimping connection being effected, with only the right hand portion of the cross-sectional view being shown.
Figure 3:
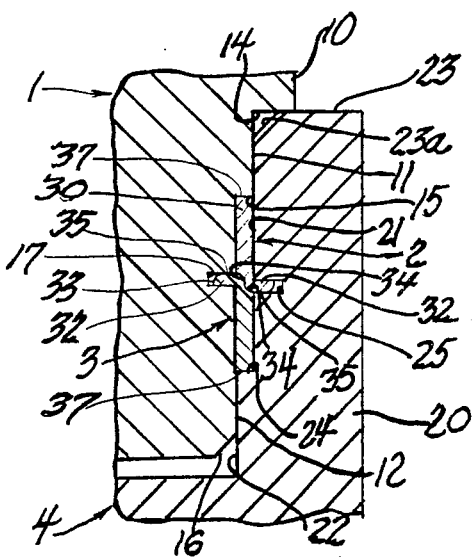
FIG. 3 is a view similar to FIG. 2 but showing the inner and outer members axially connected together by the self crimping connection.

The inner member 1 includes a main body portion 10, which, although being shown as cylindrical, can be of any desired hollow or solid configuration, that terminates adjacent to its lower end, with reference to FIGS. 1–3, in a stepped cylindrical configuration so as to define a circular inboard or upper wall 11 and an outboard or lower wall 12 of reduced external diameter relative to that of upper wall 11, the descriptive terms for these walls being used in particular with reference to FIG. 1. Upper wall 11 is connected to the main body portion 10 by a flat shoulder 14 and walls 11 and 12 are interconnected by a flat shoulder 15. Preferably, as shown, the free or lower end of wall 12 is provided with a chamfered edge 16.

In the construction shown in FIGS. 1–3, the lower wall 12 intermediate its ends is provided with an annular groove 17 extending radially inward at right angles to the central axis of walls 11 and 12. This groove 17 is of a predetermined width and is located a predetermined axial extent down from the 15 for a purpose to be described.

The outer member 4 includes a main body portion 20, which although also being shown as cylindrical can be of any desired hollow or solid configuration, is provided at its free or upper end, with reference to FIGS. 1-3, with a stepped bore that defines an outboard or upper wall 21 and an inboard or lower wall 22 of smaller internal diameter than the upper wall 21.

As best seen in FIGS. 2 and 3, the upper wall 21 is sized so as to slidably receive the upper wall 11 of the inner member 1, while the lower wall 22 of the outer member 4 is sized to slidably receive the lower wall 12 of the inner member 1. Also as shown, the upper wall 21 is connected at its upper end to a flat shoulder 23 via a chamfered inner edge 23a and at its lower end is connected to wall 22 by a flat shoulder 24. In this embodiment, the upper wall 21 is also provided with an annular groove 25 similar to groove 17 with this groove 25 being located a predetermined axial extent from the flat shoulder 24.

In addition and as best seen in FIGS. 2 and 3, when the inner member 1 is inserted into the outer member 4, the lower wall 12 of the inner member 1 defines with the upper wall 21 of the outer member 4 an annulus cavity 25, not numbered, between the flat shoulders 15 and 24 of the inner member 1 and outer member 4, respectively, which is sized to receive the first and second bushings 2 and 3 in a manner to be described.

Figure 4:
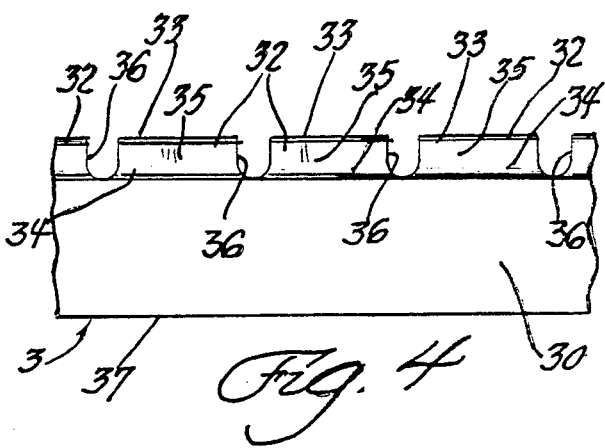
FIG. 4 is an enlarged elevational view of a portion of one of the self crimping bushings in the structures shown in FIGS. 1–3.
Figure 12:
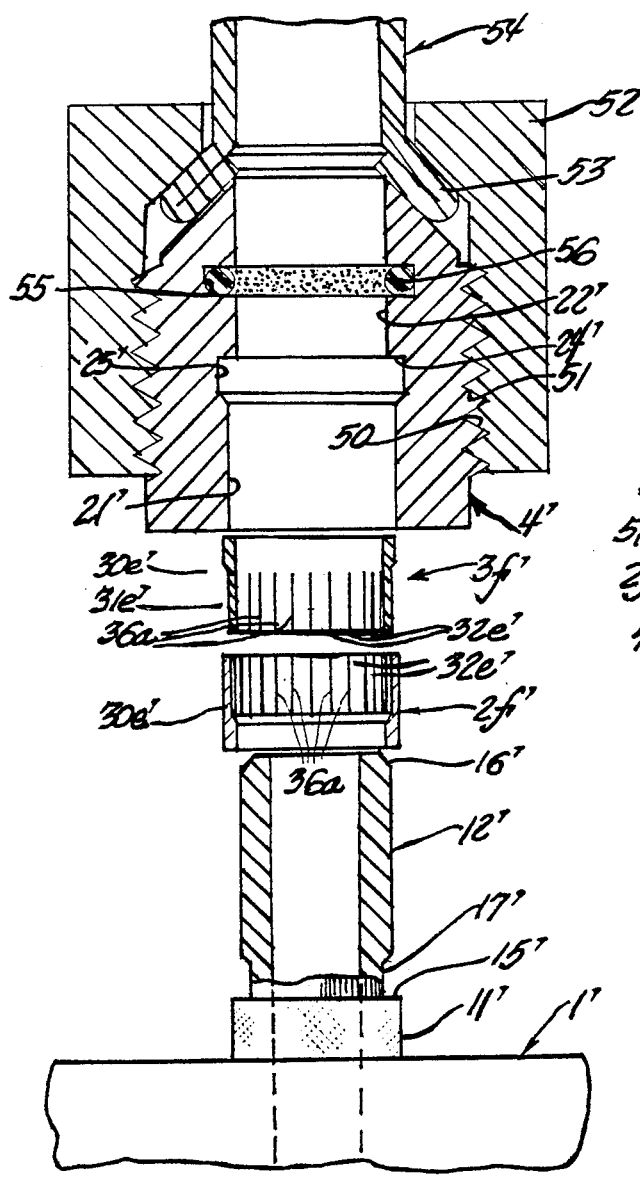
FIG. 12 is an exploded view, similar to FIG. 1, of an alternate embodiment of a self crimping connection of tubular inner and outer members in a tube coupling structure to effect both axial and rotative retention of these members relative to each.

Referring now to the first and second bushings 2 and 3, respectively, each can be formed as a solid ring, or as shown in FIG. 1 they can each be in the form of a split ring for ease of manufacturing for a reason to become apparent. As best seen in FIGS. 1 and 4, each of the first and second bushing 2 and 3, respectively, as formed includes a body portion 30 having internal and external diameters such that it will be slidably received in the annulus cavity 25 and a crimp collar portion 31. The second bushing 3 as best seen in FIGS. 1 and 4 is provided with a plurality of circumferentially spaced apart crimp portions 32 one side surface of these crimp portions being coterminous with the inner wall of the body portion 30 as shown in FIG. 1. As shown, the crimp collar portion 31 and thus the crimp portions 32 are of reduced radial thickness equal to slightly less than half the radial thickness of the associate body portion 30. In this embodiment, notches or slots 36 are provided between adjacent sets of the crimp portions 32 with the angular extent of the crimp portions 32 being substantially larger than that of the notches 36, which may also take the form of saw kerfs 36a as shown in FIG. 12, so that angular alignment of the crimp portions 32 on the first and second bushings 2 and 3 is not required.

In the embodiment of FIGS. 1-4, each of the crimp portions 32, as originally formed and as best seen in FIG. 2, is of S-shape configuration when viewed in cross-section with an outboard or leading curved cam portion 33 and an inboard or trailing curved cam portion 34. As best seen in FIG. 2, each of the curved cam portions 33 and 34 are of a predetermined radius and are interconnected by a flat surface 35 that is parallel to the straight side of the associate bushing 3.

The first bushing 2 is of similar construction as that of the second bushing 3, as described, except that the flat side surface of its crimp portions 32 are coterminous with the outer wall of its associate body portion 30 as best seen in FIG. 1. By forming the bushings 2 and 3 as split rings, each can be initially formed of flat stock material and then rolled as required to either form the first bushing or the second bushing 3.

During initial assembly, the second bushing 3 is positioned in the outer member 4 so as to be loosely positioned in the upper wall 21 with the flat shoulder 37 of its body 30 in abutment against the flat shoulder 24 and with its crimp portions 32 extending axially upward. The first bushing 2 can be similarly mounted but with its crimp portion 32 extending axially downward so as to interengage the crimp portions 32 of the second bushing 3. The inner member 1 is then inserted into the outer member 4 such that its lower wall 12 extends through the first and second bushings 2 and 3, respectively, so that its flat shoulder 15 engages the flat shoulder 37 of the first bushing 2, the position shown in FIG. 2.

Thereafter an axial force is applied so that, in effect, the inner member 1 is pressed into the outer member 4, deforming the first and second bushings 2 and 3, respectively, as follows:

The first bushing 2, being contained by portions of the inner and outer members 1 and 4, respectively, is prevented from moving downward, with reference to FIGS. 2 and 3, by the second bushing 3. This causes the crimp portions 32 to deform into the groove 25 in the outer member 4 so that its cam portions 33 and a portion of its flat surface 35 extend radially into this groove 25, as a result of its cam portion 33 engaging the cam portions 34 of the second bushing 3.

Simultaneously, the second bushing 3 is also contained by the inner and outer members 1 and 4, respectively, so that its crimp portions 32 are deformed, in a similar manner as described above relative to the first bushing 2, into the groove 17 in the inner member 1.

The self crimping connection is thus completed as shown in FIG. 3, with a portion of the first bushing 2 deformed into the outer member 4 and with a portion of the second bushing 3 deformed into the inner member 1, as described hereinabove, with the inner and outer members 1 and 4, respectively, thus connected together so as to prevent axial movement of the inner member 1 relative to the outer member 4. As shown in FIG. 3, the spacing of the grooves 17 and 25 and the dimensions of the first and second bushings 2 and 3, respectively, are selected so that in the final assembled position the shoulder 14 of the inner member 1 abuts against the shoulder 23 of the outer member 4.

It should thus now become apparent to those skilled in the art, that in order to axially pull apart the inner member 1 from the outer member 4, a sufficient axial force must be applied that is large enough so that the respective crimp portions 32 of the first and second bushings 2 and 3, respectively, will be sheared off where they are deformed into the respective grooves 25 and 17. It will also become apparent that by proper selection of the bushing material and their cam geometry, disassembly forces can be made to exceed the assembly forces used to effect the self crimping connection.

Referring now to FIGS. 5 and 6 there is shown an alternate embodiment of a self crimping connection in accordance with the invention, wherein similar parts are designated by similar numerals but with the addition of a suffix (a) where appropriate.

In this alternate embodiment the walls 12 and 21 of the inner member 1 and outer member 4, respectively, have their respective grooves 17a and 25a each inclined at an angle to the surfaces of these walls. In addition, the first and second bushings 2a and 3a, respectively, have their respective body portion 30a and crimp collar portion 31a, as formed, of equal widths and the crimp portions 32a of each is merely provided with a flat, inclined cam portion 33a at its associate outboard or free end, as best seen in FIG. 5.

Accordingly, as the inner member 1 is forced axially relative to the outer member 4, from the position shown in FIG. 5 to the position shown in FIG. 6, the cam portions 33a will interengage so as to crimp the crimp portions 32a of the first bushing 2a into engagement in the groove 25a of the outer member 4 and at the same time to crimp the crimp portions 32a of the second bushing 2a into engagement in the groove 17a of the inner member 1.

Further alternate embodiments of self crimping connections in accordance with the invention are shown in FIGS. 7, 8, 9, 10 and 11, wherein similar parts are also designated by similar numerals but with the addition of a suffix (b, c, d, e, f), respectively, where appropriate and showing the inner and outer members 1 and 4, respectively, connected together by the respective self crimping connections.

Referring first to FIG. 7, in this embodiment, each of the first and second bushings 2b and 3b, respectively, includes a body portion 30b and a straight, as formed, crimp collar portion having circumferentially spaced apart crimp portions 32b each of which terminates at its free end in a flat end surface 38 so as to engage an inclined flat chamfered or cam surface 39 formed on the associate body portion 30b on the side opposite the associate crimp portions 32b. Thus as shown, as the inner member 1 and outer member 4 are axially forced together into the position shown, a portion of each of the crimp portions 32b of the second bushing 3b is forced into locking engagement in groove 17b of the inner member 1 while a portion of the crimp portions 32b of the first bushing 2b are forced into locking engagement in groove 25b of the outer member 4. In this embodiment as shown, the thickness of the crimp portions 32b are substantially less than half the thickness of the body portion 30b in each of the first and second bushings 2b and 3b, respectively.

In the self crimping connection embodiment shown in FIG. 8, the slots 17c and 25c, in the inner member 1 and outer member 4, respectively, are inclined at an angle relative to the surfaces 12 and 21 and are of a predetermined width so as to slidably receive the leading end crimp portions 32c of the first and second bushings 2c and 3c, respectively. As shown, each of the first and second bushing 2c and 3c have a curved cam portion 33c formed as an interconnection between the crimp portions 32c and the associate body portion 30c.

The self crimping connection embodiment shown in FIG. 9, uses first and second bushings 2d and 3d that are similar to those described above with reference to the FIG. 8 embodiment, except that in the FIG. 9 embodiment, their leading end crimp portions 32d are adapted to be crimped into relative wide, right angle grooves 17d and 25d in the surfaces 12 and 21, respectively, of the inner and outer members 1 and 4, respectively, so that the crimped portions extending into the respective grooves 17d and 25d merely engages the corner edges defined by the wall 12 and a wall of groove 17d or wall 21 and a wall defining a part of groove 25d.

Referring now to the self crimping connection embodiment shown in FIG. 10, the groove 17e in the wall 12 of the inner member 1 is defined on one side by a cam shoulder surface 41 formed at an obtuse angle from the wall 12 to terminate at a base surface 42 and, the opposite side of the groove 17e is defined by part of the shoulder 15e which extends radially inward to connect with the base surface 42. The groove 25e in the wall 21 of the outer member 4 is of similar configuration so as to include an inclined cam shoulder surface 43, a base surface 44 and a portion of the shoulder 24e.

In this FIG. 10 embodiment each of the first and second bushings 2e and 3e, respectively, have a body portion 30e which is of a lesser axial extent than that of its, as formed, associate straight crimp collar portion having circumferentially spaced apart crimp portions 32e each of which terminates at its free end in a flat end surface 38e. As shown, each body portion 30e at its inboard end is provided with an inclined, flat, chamfered or cam surface 39e that connects to the associate adjacent surface of the crimp collar portion 31e, this cam surface 39e having an angle that is formed complementary to those of the associate shoulder surfaces 41 or 43.

Thus, during a crimping operation, as the inner member 1 and outer member 4 are forced axially together, to the position shown in FIG. 10, the end surface 38e of a crimp portion 32e of the second bushing 3e engages the cam surface 39e of the first bushing 2e and is forced radially inward and guided by this cam surface 39e and the shouldered surface 41 into engagement with the base surface 42 which then causes a portion of the free end of this crimp portion 32e to be further crimped so as to extend substantially parallel to the base surface 42. It should now be apparent that as shown in FIG. 10, the crimp portions 32e of the first bushing 2e will be deformed or crimped in a similar manner as that described relative to the second bushing 3e and, accordingly, it is not deemed necessary to describe the crimping of the crimp portions 32e of the first bushing 2e.

Referring now to the self crimping connection shown in FIG. 11, in this embodiment, which is similar to the embodiment shown in FIG. 10, the first and second bushings 2f and 3f are made in the form of split rings with a sufficient gap between the free ends of the second bushing 3f for a purpose to be described.

In a manner similar to the previously described FIG. 10 embodiment, in the FIG. 11 embodiment, the groove 17f in the wall 12 of the inner member 1 is defined on one side by a cam shoulder surface 41f formed at an obtuse angle, the opposite side of the groove 17f is defined by part of the shoulder 15f which extends radially inward to interconnect with the base surface 42f. The groove 25f in the wall 21 of the outer member 4 is of similar configuration so as to include an inclined cam shoulder surface 43f, a base surface 44f and a portion of the shoulder 24f.

In this FIG. 11 embodiment, each of the first and second bushings 2f and 3f, respectively, have a body portion 30f which is of a lesser axial extent than that of its, as formed, associate crimp collar portion having the circumferentially spaced apart crimp portions 32f, each of which terminates at its free end in a flat end surface 38f. As shown, each body portion at its inboard end is provided with an inclined, flat, chamfered or cam surface 39f that connects to the associate adjacent surface of the crimp collar portion 31f. This cam surface 39f having an angle that is formed complementary to those of the associate shoulder surfaces 41f and 43f on the inner member 1 and outer member 4, respectively.

Also in this FIG. 11 embodiment, since the first and second bushings 2f and 3f are in the form of split rings, the body portion 30f of the first bushing 2f, as formed, has an external diameter so as to be slidably received by the upper wall 21 of the outer member 4, but it has an internal diameter that is less than external diameter of the lower wall 12 of the inner member 1. In a similar manner, the body portion 30f of the second bushing 3f, as formed, has an internal diameter so as to be slidably received by the lower wall 12 of the inner member 1 and an external diameter that is greater than the internal diameter of wall 21 of the outer member 4.

Accordingly, in this embodiment prior to assembly of the inner member 1 into the outer member 4, the first bushing 2f must be expanded radially outward so that it can slide axially over the lower wall 12 of the inner member 1 to a position at which it can be released so that the body portion 30f thereof can contract into the groove 17f in the inner member 1 to the position shown in FIG. 11. It will now be apparent that the second bushing 3f must be compressed radially inward so that it can slide axially within the upper wall 21 of the outer member 4 to a position at which it can be released so that the body portion 30f thereof can expand outward into the groove 25f in the outer member 4 to the position shown in FIG. 11.

The inner member 1 with the first bushing 2f thus attached thereto can be inserted into the outer member 4 with the second bushing 3f previously inserted therein. Thereafter, the self crimping connection of the inner member 1 and outer member 4 can be obtained in the same manner as described hereinabove with reference to the FIG. 10 embodiment.

Figure 13:
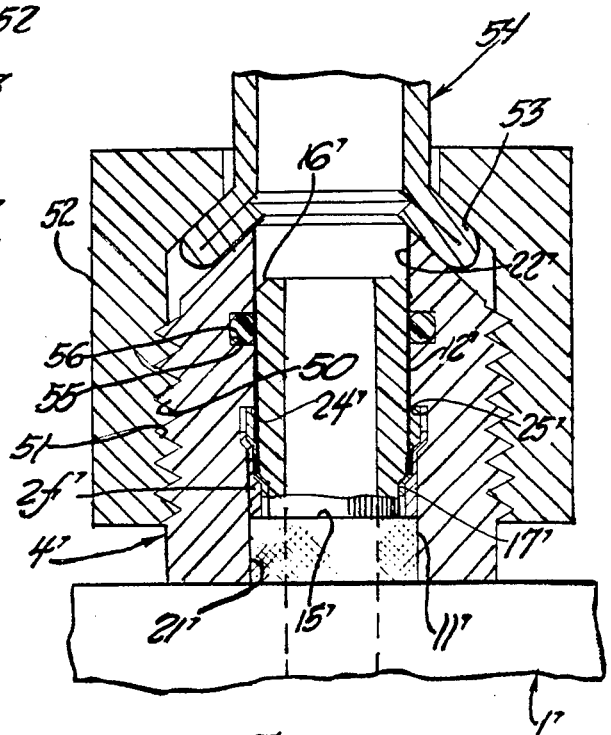
FIG. 13 is a cross-sectional view of the elements of FIG. 12 in an assembled position; and, FIG. 14 is a cross-sectional view of a further embodiment of self crimping connection of tubular inner and outer members, similar to FIG. 13 but applied to a different form of tube coupling structure.

An alternate embodiment of a self crimping connection of tubular inner and outer members in accordance with the invention as applied to a tube coupling structure to effect both axial and rotative retention of these members relative to each other is shown in FIGS. 12 and 13, wherein similar parts are designated by similar numerals, but with the addition of a suitable suffix, as applicable.

In the alternate embodiment shown in FIGS. 12 and 13, the inner member 1' is in the form of a machine element having a tubular boss extending outward from the main body portion thereof a predetermined extent and it is provided with a circular inboard wall 11' and an outboard wall 12' of reduced external diameter relative to wall 11', the outboard wall having an annular groove 17' therein adjacent to the interconnecting shoulder 15'. At its free end the wall 12' is connected to the free end surface by a chamfered edge 16'. In addition, in the construction shown in FIGS. 12 and 13, at least the outer peripheral surface of the inboard wall 11' is knurled as shown by the cross-hatching of this wall 11'.

In this construction, the outer member 4' is in the form of a tubular fluid line adapter having external threads 50 for threaded engagement with the internal threads 51 of an inverted flare nut 52 with these elements being configured in a manner well known in the tube coupling art to sealingly engage the flared end 53 of a tube, generally designated 54.

In the construction shown, the outer member 4' is provided with a through bore defining a circular internal outboard wall 21' and an inboard wall 22' complementarily sized relative to the wall 11' and 12', respectively, of the inner member 1' so as to slidably receive these walls. Wall 21' is provided with an annular groove 25' one side of which is defined by a portion of a shoulder 24'. In addition, wall 22' is provided with an annular groove 55, axially spaced from groove 25' to receive an O-ring seal 56.

In the construction shown in FIGS. 12 and 13, the grooves 17' and 25' in the inner and outer members 1' and 4' and the first and second bushings 2f' and 3f' are structurally and functionally the same as the corresponding elements described and illustrated with reference to the FIG. 10 embodiment and thus it is not deemed necessary to again describe these elements. It should however be noted that outboard wall 12' of the inner member 1' is of a suitable axial extent so as to sealingly engage the O-ring seal and that, in this embodiment, the adjacent crimp portions 32e on the first and second bushing 2f, and 3f, are separated by slots in the form of saw kerfs 36a, as best seen in FIG. 12.

However, as shown in FIG. 13, when the self crimping connection is made, the knurled surface of the inboard wall 11' of the inner member 1' will frictionally engage the wall 21' of the outer member 4' so as to prevent rotation of these elements with respect to each other so that an operator can uncouple or recouple the inverted flare nut 52.

Figure 14:
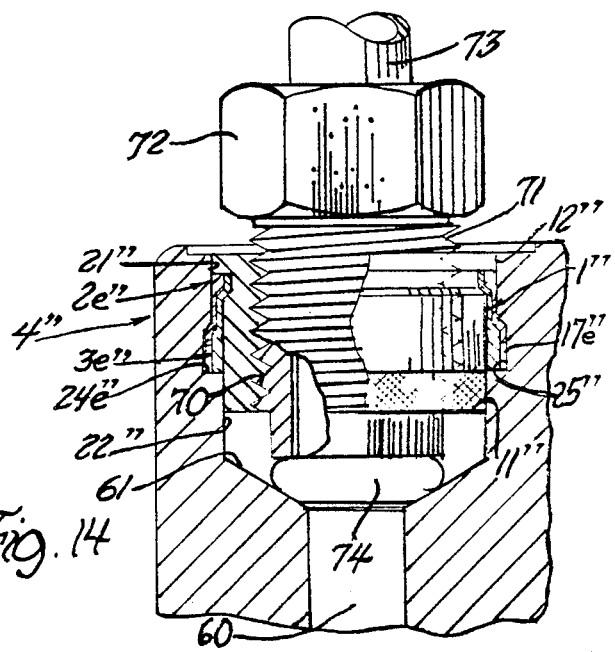

A further embodiment of a self crimping connection of inner and outer members in accordance with the invention as applied to another form of a tube coupling structure to effect both axial and rotative retention of these members relative to each other is shown in FIG. 14, wherein similar parts are designated by similar numerals, but with the addition of a suitable suffix, as applicable.

In the construction shown in FIG. 14, the outer member 4'' is in the form of a machine element such as a gear housing with a stepped bore therein defining a circular internal outboard wall 21'', an inboard wall 22'' of reduced internal diameter relative to wall 21'', with the wall 22'' being connected to a fluid passage 60 by an inclined seal shoulder 61. As in the FIGS. 10, 12 and 13 structures, the outboard wall 21'' is provided with an annular groove 25'' and an abutment shoulder 24e''.

In this construction, the inner member 1'' is in the form of a tubular insert provided with internal threads 70 to threadingly receive the external threads 71 of a hex-headed tube fitting 72 encircling the body of a tube 73 having a raised annular head 74 at one end thereof which is adapted to be sealingly sandwiched between the seal shoulder 61 in the outer member 4'' and the end face of the hex-headed tube fitting 72 in a manner well known in the tube coupling art.

As shown in FIG. 14, the inner member 1'' is provided with a circular inboard or upper wall 12'' and an outboard or lower wall 11'' of a smaller external diameter than wall 12'' and the wall 11'' has an annular groove 17e'' similar to that described and shown with reference to the FIG. 10 embodiment. In addition, at least the lower end of wall 11'', with reference to FIG. 14, is provided with a knurled surface as shown by the cross-hatching in the right hand side of this Figure.

The first and second bushings 2e'' and 3e'' in this FIG. 14 embodiment are structurally and functionally similar to the corresponding elements described and illustrated with reference to the FIG. 10 embodiment and also to those in the FIGS. 12 and 13 embodiment and, accordingly, it is not deemed necessary to further describe these elements and how they are self crimped.

Thus in a manner as described hereinabove with reference to the embodiment shown in FIGS. 12 and 13, in the FIG. 14 embodiment, the inner member 1" is operatively connected to the outer member 4" by the first and second bushings 2e" and 3e", respectively, and by the knurled portion of wall 11" engaging the wall 22", whereby the inner member 1" is retained both axially and rotatively relative to the outer member 4".

While the invention has been described with reference to the structures disclosed herein, it is not confined to the details set forth and thus this application is intended to cover such modifications or changes as may come within the purposes of the improvement or the scope of the following claims.

The embodiments of the invention in which an exclusive property or privilege is claimed are defined as follows:

1. A self crimping connection for inner and outer members includes an inner member having a body portion with one end thereof provide with a stepped diameter cylindrical surfaces defining an external inboard wall and an outboard wall of reduced diameter relative to the inboard wall with said inboard wall and said body portion, and said outboard wall and inboard wall being interconnected by first and second flat shoulders, respectively and having an annular slot in said outboard wall; an outer member having a body portion with a stepped bore in one end thereof defining a circular internal outboard wall and an inboard wall each of a diameter slidably receiving said inboard wall and said outboard wall of said first member, respectively, with said outboard wall being connected to said inboard wall by a flat shoulder and having an annular groove therein, said outboard wall of said outer member defining with said outboard wall of said inner member between said second flat shoulder and said flat shoulder an annulus chamber when said first shoulder is in abutment against the outer end surface of said outer member; and, first and second bushings means positioned in said annulus chamber with said first bushing means having one end thereof in abutment with said second shoulder and its opposite end portions extending into said annular groove in said outboard wall of said outer member and, said second bushing means having one end thereof in abutment against said flat shoulder and its opposite end portions extending into said annular slot inner said inner member.

2. A self crimping connection for inner and outer members according to claim 1, wherein each of said first bushing means and said second bushing means is in the form of a split ring and which in its as formed shape prior to crimping includes a body portion, a crimp collar portion having circumferentially spaced apart crimp portion and cam surface means such that the crimp portions are self crimping.

3. A self crimping connection for inner and outer members includes an inner member having a body portion with one end thereof provided with a stepped diameter cylindrical surface defining an external inboard wall and an outboard wall of reduced diameter relative to the inboard wall with said inboard wall and said body portion, and said outboard wall and inboard wall being interconnected by first and second flat shoulders, respectively, and having an annular slot in said outboard wall; an outer member having a body portion with a stepped bore in one end thereof defining a circular internal outboard wall and an inboard wall each of a diameter slidably receiving said inboard wall and said outboard wall of said first member, respectively, with said outboard wall being connected to said inboard wall by a flat shoulder and having an annular groove therein, said outboard wall of said outer member defining with said outboard wall of said inner member between said second flat shoulder and said flat shoulder an annulus chamber when said first shoulder is in abutment against the outer end surface of said outer member; and, first and second bushings means positioned in said annulus chamber with said first bushing including a body portion having one end thereof in abutment with said second shoulder and a crimp collar portion with the free end portions thereof extending into said annular groove in said outboard wall of said outer member and, said second bushing including a body portion with the free end thereof in abutment against said flat shoulder and a crimp collar portion with the free end portions thereof extending into said annular slot in said inner member.

4. A method of assembling an inner member to an outer member by self crimping connection, said method including providing said inner member with stepped external diameter walls to thus define an annular outboard wall and an inboard wall of greater diameter that is connected to said outboard wall by a flat first shoulder, and to the main body portion by a flat second shoulder, providing said outboard wall with an annular groove intermediate the end thereof; providing said outer member with a stepped bore at one end thereof so as to define circular, inboard and outboard walls each of a diameter so as to slidably receive said outboard and inner walls, respectively, of said inner member, with said inboard and outboard walls of said outer member being interconnected by a flat shoulder, placing a ring-like second bushing having a body portion and spaced apart cam/crimp portions integral with one end of said body portion so as to encircle said outboard wall of said outer member in abutment against said flat shoulder, placing a ring-like first bushing having a body portion with spaced apart cam/crimp portions extending therefrom so as to encircle said outboard wall of said inner member with the opposite end of said body portion of said first bushing in abutment against said first shoulder, inserting said inner member with said first bushing into said outer member until said cam/crimp portions of said first bushing engage said cam/crimp portions of said second bushing and, then axially moving said inner member into said outer member with a sufficient axial force whereby a portion of said cam/crimp portion of said first bushing are crimped into locking engagement inside said annular groove in said outer member by the sliding engagement of said cam/crimp portions of said first bushing against the said cam/crimp portions of said second bushing and a portion of said cam/crimp portions of said second bushing are crimped into locking engagement inside said annular groove in said inner member by the sliding engagement of said cam/crimp portions of said second bushing against the said cam/crimp portions of said first bushing.

* * * * *